US006724886B1

(12) United States Patent
Watson

(10) Patent No.: US 6,724,886 B1
(45) Date of Patent: Apr. 20, 2004

(54) SYSTEM AND METHOD FOR ASSURING CONNECTION OF TTY TELEPHONE CALLS TO A CALL CENTER

(75) Inventor: Thomas Michael Watson, Raymore, MO (US)

(73) Assignee: Sprint Communications Company L.P., Overland Park, KS (US)

(*) Notice: Subject to any disclaimer, the term of this patent is extended or adjusted under 35 U.S.C. 154(b) by 599 days.

(21) Appl. No.: 09/784,759

(22) Filed: Feb. 15, 2001

(51) Int. Cl.[7] .......................... H04M 3/00; H04M 5/00; H04M 11/00
(52) U.S. Cl. ................. 379/265.02; 379/52; 379/265.13
(58) Field of Search .................... 379/265.02, 265.09, 379/265.11, 265.13, 266.02, 52, 93.14, 93.17; 340/825.19; 348/14.01

(56) References Cited

U.S. PATENT DOCUMENTS

| 5,787,148 | A |   | 7/1998 | August |
| 5,926,539 | A |   | 7/1999 | Shtivelman |
| 6,046,762 | A |   | 4/2000 | Sonesh et al. |
| 6,078,650 | A | * | 6/2000 | Hansen .......................... 379/52 |
| 6,570,963 | B1 | * | 5/2003 | Watson et al. ................. 379/52 |
| 6,574,323 | B1 | * | 6/2003 | Manuel et al. ......... 379/207.02 |

FOREIGN PATENT DOCUMENTS

| EP | 0821510 A2 | 1/1998 |
| EP | 0848552 A1 | 6/1998 |
| WO | WO 99/14951 | 3/1999 |

OTHER PUBLICATIONS

Fisher, James, "Sprint Announces New Service for Deaf in Texas" Sep. 6, 1996, Kansas City, MO, http://144.226.116.29/PR/CDA/PR_CDA_Press_Releases_Detail_PF/0,1586,1460,00.htm.

Luxner, Larry, "VRI adds visual dimension for the hearing–impaired," Telephony XP–002222502, Aug. 12, 1996, Primedia Business Magazines & Media, Inc.

Hadley, Terry, "Texas Launches Video Relay Service Deaf & Hard–of–Hearing Benefit from Improved Communications," News Releases Public Utility commission of Texas, XP–002222503, Austin, TX, Sep. 1, 2000.

* cited by examiner

Primary Examiner—Benny Tieu

(57) ABSTRACT

A call center handles TTY calls for the hearing and speech impaired. The call center includes a modem bank housing multiple modems. Each modem in the modem bank is connected to a switching system and a network. Terminals for handling the calls are also connected to the network. A call controller is connected to the network and to the switching system. When a call is received by the switching system, call information is transmitted to the call controller by the switching system. The call is then extended by the switch to a modem in a modem pool. The modem bank controller then requests the identity of an available terminal to handle the call from the call controller. The call controller determines which of terminals is available to handle the incoming call. The identity of the selected terminal is transmitted to the modem bank controller. The modem bank controller commands the modem receiving the call to then transmit data received to the selected terminal.

35 Claims, 16 Drawing Sheets

SYSTEM AND METHOD FOR ASSURING CONNECTION OF TTY TELEPHONE CALLS TO A CALL CENTER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the provision of telecommunication services to the deaf and hearing impaired. More particularly, the invention is related to a call center for handling TTY calls for the deaf and hearing impaired. Still more particularly, this invention is related to reducing the number of TTY that are not completed and a system for accurately tracking the total number of calls to a TTY call center.

2. Description of the Prior Art

Title IV of the Americans with Disabilities Act of 1990 requires the Federal Communications Commission (FCC) to ensure that telecommunication services are provided to the hearing and speech impaired. Telecommunication Relay Services (TRS) are used provide the functional equivalent of telecommunication services to the hearing and speech impaired. TRS have been available on a nationwide basis since 1983.

TRS operates in the following manner. A calling party for this system may be a hearing or speech impaired person or a person wishing to talk to the hearing or speech impaired. The calling party has a TDD/TTY which is a device for transmitting and receiving typed messages. The calling party places a call by dialing a local toll free number. The call is extended to a communication assistant terminal in the call center. The call is a modem connection between the calling party and the communication assistant terminal. The calling party then types a telephone number that the calling party wishes to call. A call is then placed by the communication assistant to the telephone number. When a call is established with a party at the desired telephone number, the calling assistant relays the messages between the calling party and the called party. The calling party types in messages that are read by the calling assistant to the called party. The called party speaks to the calling assistant, who types in the called party's message. This operation is performed in an opposite manner when a person is calling a hearing or speech impaired person.

The local toll free number called by a party extends the call to a call center that provides TRS. A conventional call center is illustrated in FIG. 1. In call center 100, a switching system 101 is connected to a modem 111 in each of terminals 110 and to a call controller 120. One type of switching system typically used in a call center 100 is a Rockwell Galaxy ACD switch. Call controller 120 is a system having a processing unit and associated memory.

Call controller 120 determines which terminal is available to handle a call. When switching system 101 receives a request for a call set-up, switching system 101 transmits a request to call controller 120 for an available terminal. Call controller 120 responds to switching system 101 by transmitting an identity of an available terminal. Switching system 101 then extends the call to the identified terminal.

Each terminal 110 is a computer system 112 that can convert signals received via modem 111 into a text message that is displayed upon screen 113. Each terminal 110 also has a telephone station 115 connected to switching system 101 to receive and to place voice telephonic calls. The communication assistant can enter text into computer system 112 via keyboard 114. Computer system 112 converts the entered text into text messages transmitted to a calling party over the connection established with modem 111. Computer 112 is also connected to a network 150. When a call is completed to a terminal 110, a Call Detail Record (CDR) is generated by computer system 112. The call detail record includes information pertaining to the length of the call. The CDR is then stored in computer system 112.

A billing system 151 is then connected to each terminal 110 via network 150. Periodically, each computer system 112 transmits stored CDRs to billing system 151 for processing. The billing system 151 then uses the call detail records to generate billing.

It is a problem that conventional call center 100 cannot record calls that are not completed to a terminal 110. In conventional system 100, a call is extended directly to a terminal 110. If the call is not answered at the terminal, there is no record of the call. It is common for a call not be completed, as the calling party may hang up before a calling assistant is available to handle the call at the terminal 110. Most TRS providers charge agencies for the amount of calls handled by the switching system 101. Currently, an algorithm is used to determined the amount of call that are received by switching system 101 but are not completed to a terminal. However, both service providers and agencies paying for the TRS service desire an improved call center which allows calls to be answered more efficiently as well as having a method for determining the amount of calls handled but not completed.

SUMMARY OF THE INVENTION

The above and other problems are solved and an advance in the art is made by a call center of this invention. A first advantage of this invention is that a record can be generated of all calls handled by the call center. A second advantage of this invention is that after a call is completed a terminal available to handle the call may be determined which allows for better assurance that the call will be handled. A third advantage is that a terminal handling the call does not have to be physically connected to the switching system.

This invention is a call center that handles TTY calls for the hearing and speech impaired. The call center includes a modem bank housing multiple modems. Each modem in the modem bank is connected to a switching system and a network. Terminals for handling the calls are also connected to the network. A call controller is connected to the network and to the switching system.

When a call is received by the switching system, call information is transmitted to the call controller by the switching system. The call is then extended by the switch to a modem in a modem pool. The modem bank controller then requests the identity of an available terminal to handle the call from the call controller.

The call controller determines which of terminals is available to handle the incoming call. The identity of the selected terminal is transmitted to the modem bank controller. The modem bank controller commands the modem receiving the call to then transmit data received to the selected terminal.

In a preferred embodiment, each of the terminals includes a computer system and a telephone station. Alternatively, the terminal may contain just a computer system that has software and a microphone to allow voice over IP applications. The computer system is connected to the network. The telephone station is connected to the switching system. The computer system handles calls in the following manner. When an incoming call is received, the computer system receives data of the incoming call from the selected modem in the modem bank. The data is converted by the computer system into a display of words. The display is then shown on a connected display to the communication assistant.

The communication assistant inputs data into the computer system via a keyboard or other device. The computer system receives the input data from the communication assistant. The input data is then converted into transmission data, and transmitted to the calling party via the selected modem in the modem bank handling the incoming call.

The call center may also include a Call Detail Record (CDR) server. The CDR server is connected to the network. The CDR server generates a connection record of each incoming call connected to one the modems in the modem bank. The connection record is then stored in a memory in the CDR server.

The CDR server may also generate a session record of each incoming call handled by a terminal. The session record may be a separate record or may be a subset of data in a call detail record. The session record is also stored in the memory in the CDR server. The session record is generated in the following manner. A terminal transmits a session established signal to the CDR server responsive to the terminal beginning to receive data for an incoming call from one of the modems. The terminal may then transmit a session complete signal to the CDR server responsive to the incoming call being disconnected. The CDR server receives said session established signal, receives the session complete signal, and generates the session record which includes a length of time of a session, and time of day of said session.

The modem bank includes a processing unit that executes instructions for operating the modem bank in the following manner. When one of the modems is connected to an incoming call, the modem bank generates a connection established signal and transmits the connection established signal to the CDR server. When one of the modems disconnects call, the modem bank generates a connection ended signal. The connection ended signal is transmitted by the modem bank to the CDR server. The CDR server receives the connection established signal, and the connection ended signal. From the connection established and connection ended signals, the CDR server generates the connection record from information in the established signal and the connection ended signal.

In order to determine which terminals are available to handle calls, the call controller may maintain agent database that indicates terminals are available to handle incoming calls. In order to maintain the agent database, the call controller may receive signals from terminals indicating the status of the terminal. When a communication assistant is at a terminal and the terminal is available to handle calls, the terminal generates an available signal and transmits the available signal to the call controller. When a terminal cannot handle a call, the terminal generates an unavailable signal responsive to said user not being available to handle incoming calls and transmits the unavailable signal to the call controller.

When the switching system receives a call to the call center telephone number, the switching system transmits a request to the call controller for an available modem in the modem bank. The call center then transmits the identity of a selected modem. The switching system receives the identity of the modem from said call controller and extends the incoming call to the modem. When a voice call is received by the switching system, the switching system transmits a request for an identity of a telephone station at one of the terminals available to receive an incoming call. The switching system receives the identity of a telephone station at one of the terminals and extends the incoming call to the telephone station.

DETAILED DESCRIPTION

Figure 1:
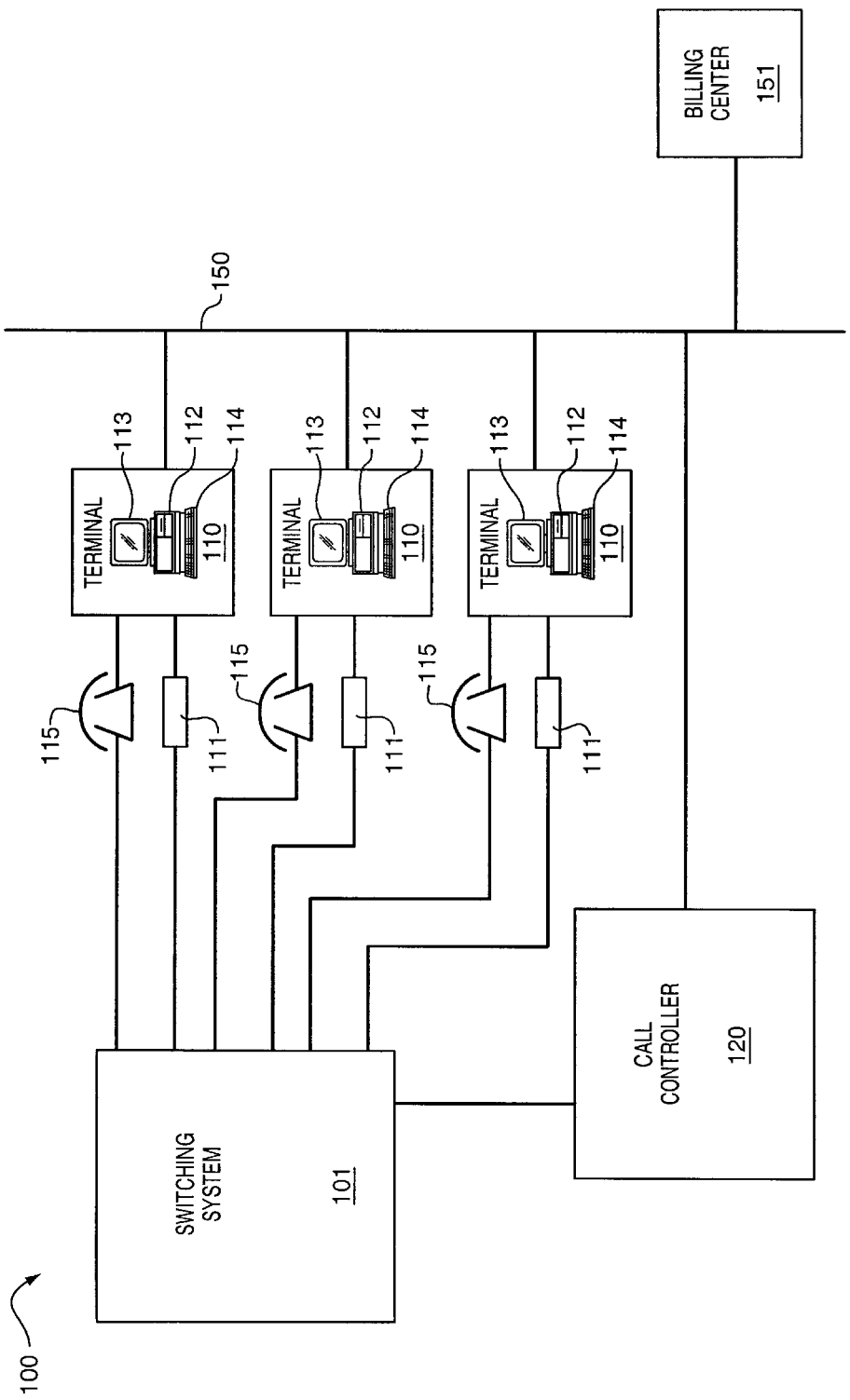
FIG. 1 illustrates a prior art call center.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 2:
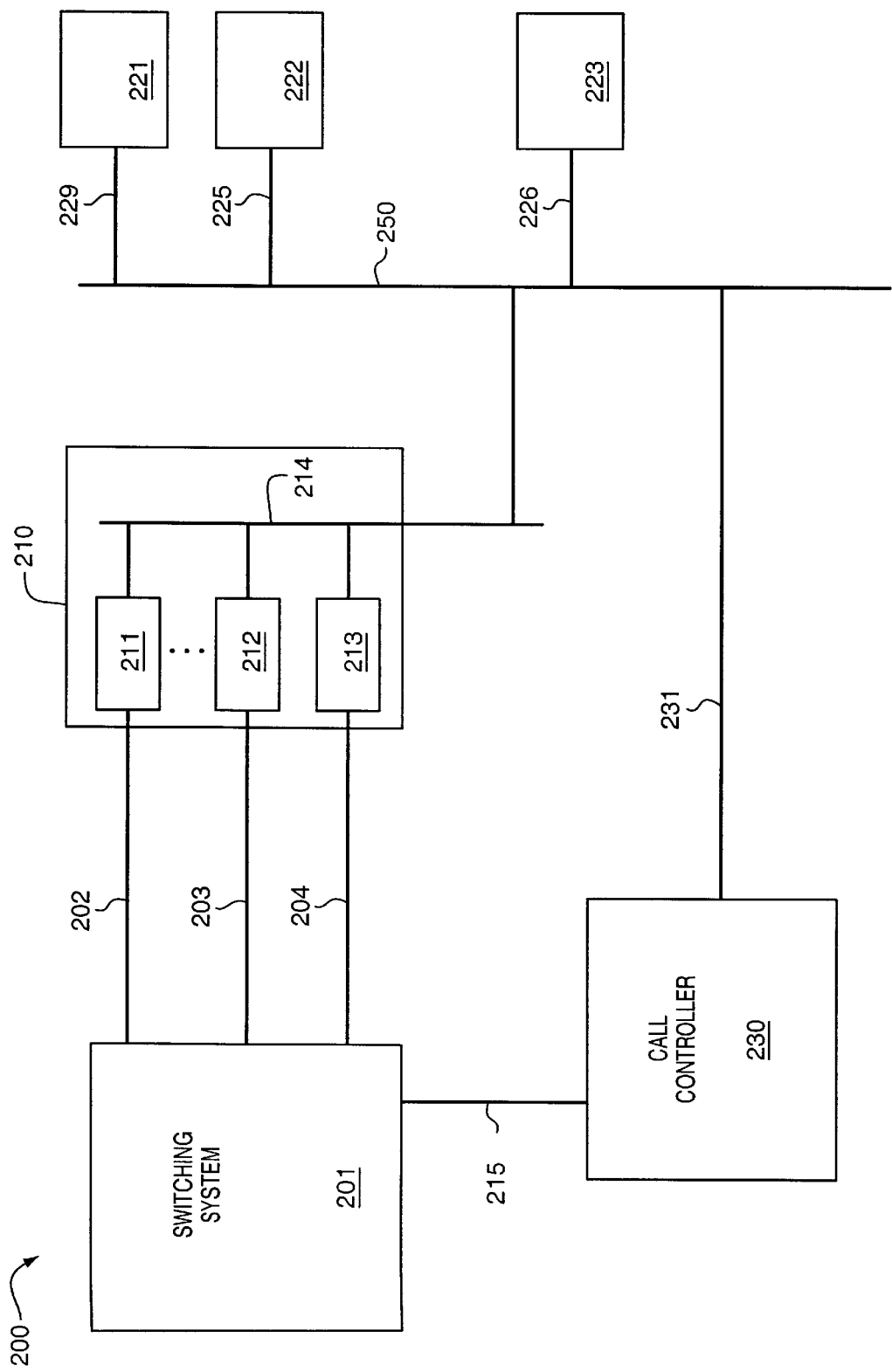
FIG. 2 illustrates a call center in accordance with this invention.

FIG. 2 illustrates a call center 200 embodying this invention. This invention allows all incoming calls from a TDD/TYY device to be connected to more accurately monitor the amount of calls handled. Furthermore, since the terminals are connected via a network to the modems, a terminal handling the call may be remote from the call center 200. One skilled in the art will recognize that some components of a call center have been omitted for the sake of clarity.

Call center 200 has a switching system 201 that connects calls to and from other locations to terminals 221–223 in call center 200. One example of a switch is a Rockwell Galaxy ACD switch. Unlike prior art call center 100, each terminal 221–223 does not have a modem connected to a computer system. Instead, modems 211–213 are in a modem bank 210. Modem bank 210 is connected to network 250 via path 214 to allow data to be transferred between a modem 211–213 and terminals 221–223. Modem bank 210 routes data between a modem 211–213 and a particular terminal 221–223. Switching system 201 is connected to each modem 211–213 via paths 202–204. Paths 202–204 may be 2 wire connections between switching system 202 and modems 211–213.

Switching system 201 is also connected to call controller 230 via communication path 215. Call controller 230 is also connected to network 250 via path 231. Call controller 230 monitors modem bank 210 and terminals 221–223 to determine which of modems 211–213 and terminals 221–223 are available to handle calls.

Figure 3:
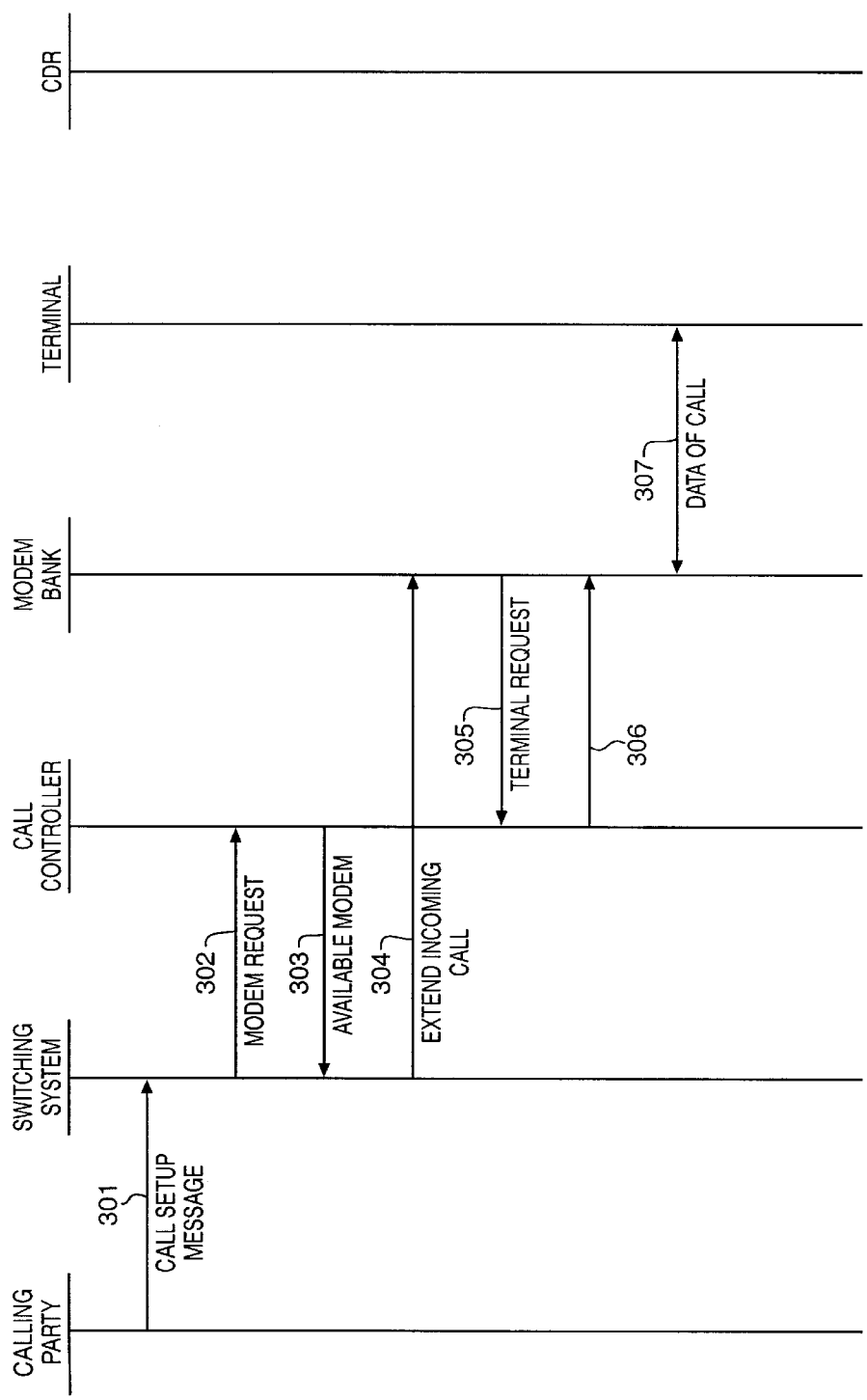
FIG. 3 illustrates a signaling chart between components in the call center.

FIG. 3 illustrates a signaling chart of signals transmitted in call center 200 to handle an incoming call from a TDD/TYY device. First, switching system 201 receives call set-up message 301 from a TDD/TYY device of the calling party. Switching system 201 transmits a modem request 302 to call controller 230 for the identity of one of the modems 211–213 that is available to receive the call. Message 303 is transmitted by call controller 230 to switching system 201 and contains the identity of a modem 211–213.

The call is extended to the identified modem 211–213 in modem bank 210 at 304. Modem bank 210 then transmits a terminal request 305 to call controller 230 requesting the identity of a terminal to handle the call. It should be noted that when a voice call is received from a person wishing to the place a call to the hearing or speech impaired, the switch requests and receives a telephone station connection in a terminal. The terminal then request an available modem to handle a call to a TDD/TYY device in a home of the hearing and/or speech impaired.

Message 306 is transmitted from controller 230 to modem bank 210 and contains the identity of the terminal 221–223 to handle the call. Messages 307 containing data of the call are then transmitted between the identified modem 211–213 in modem bank 210 and the identified terminal 221–223.

Figure 4:
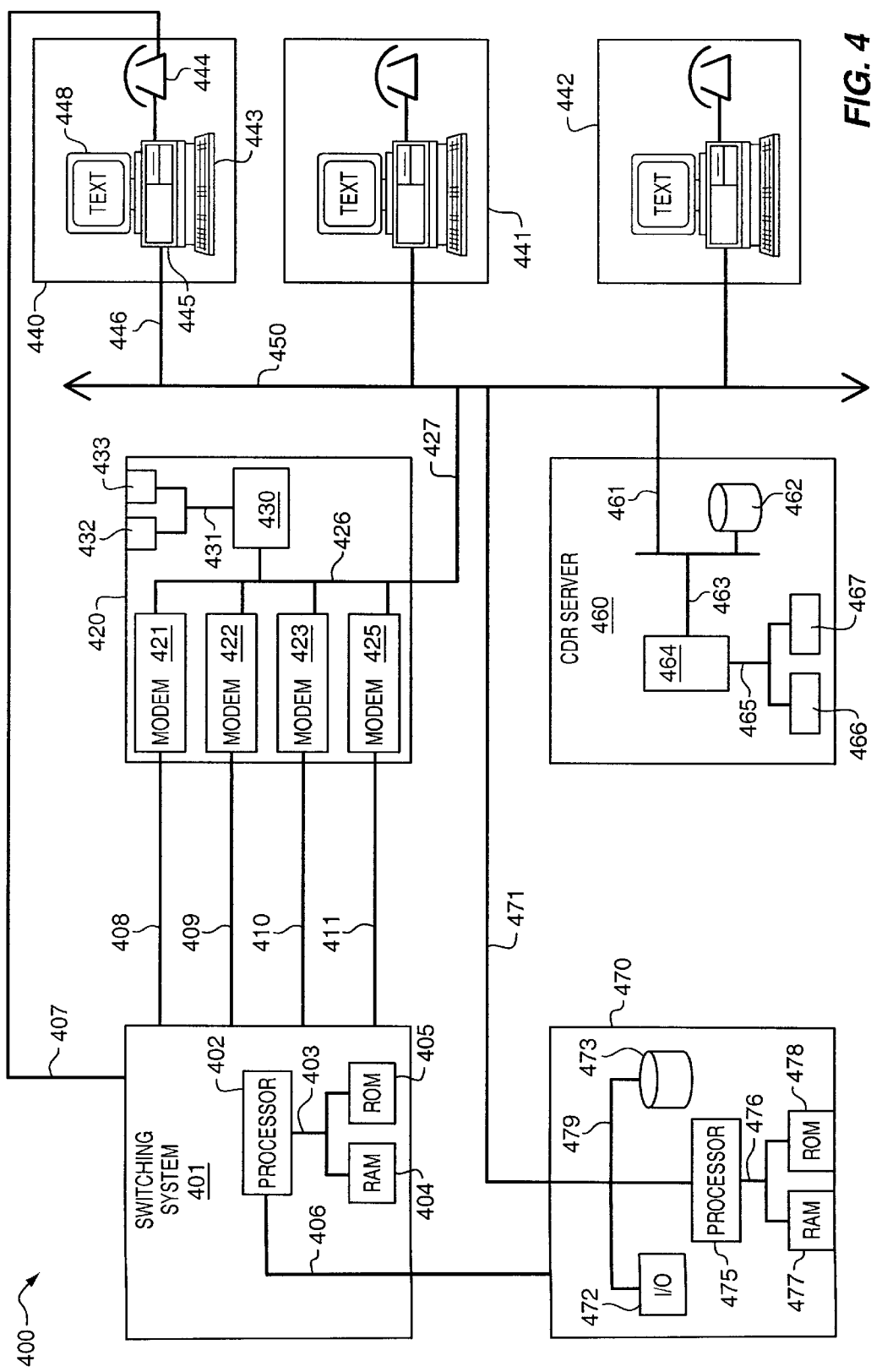
FIG. 4 illustrates a preferred exemplary embodiment of a call center in accordance with this invention.

FIG. 4 illustrates a preferred exemplary embodiment of the call center of this invention. Call center 400 includes a Call Detail Record (CDR) server 460 that logs all completed call for billing purposes. CDR server 460 provides an accurate tracking of all calls handled by call center 400 in a manner described below. Those skilled in the art will recognize that the various components described below can be combined various manners to run on the same processor. It is left to those skilled in the art to decide which components operate on independent platforms and which components are performed by a single processor. For the sake of clarity and brevity, some components of call center 400 have been omitted.

Call center 400 is connected to a switching system 401. Switching systems 401 may be a conventional switch such as a Rockwell Galaxy ACD switch. A description of the process executed by switching system 401 in response to an incoming call is given in FIG. 6. Switching system 401 has a controller/processing unit 402. For purposes of this invention, the term processing unit refers to a microprocessor, processor, group of microprocessors, or group of processors that perform instructions stored in a memory. A non-volatile memory, such as Read Only Memory 405, is connected to processing unit 402 via path 403. Non-volatile memory 405 stores instructions necessary for processing unit 402. A Volatile memory, such as Random Access Memory (RAM) 404 is connected to processing unit 402 via path 403. Volatile memory 404 stores data and instructions for processes being executed by processing unit 402.

Processing unit 402 of switching system 401 is connected to call controller 470 via path 406. Switching system 401 receives information about modems and terminal available to receive incoming calls from call controller 470 via path 406. Call controller 470 has a processing unit 475 for executing instructions for performing the processes of call controller 470. Processing unit 475 is connected to a volatile memory, such as RAM 477, and a non-volatile memory, such as ROM 478 via path 476. A bus 479 connects processing unit 475 to an I/O device 472 and a secondary memory 473. Processing unit 475 is also connected to network 450 via path 471 and bus 479. The processes executed by processing unit 475 to provide the services of call controller 470 are described in FIGS. 7–11.

Switching system 401 is connected to modems 421–424 in modem bank 420 via paths 408–411. In the preferred embodiment, paths 408–411 are 2 wire connections to switching system 401. Switching system 401 is also connected via paths 407 to telephones 444 in terminals 440–442. Although, it is possible to have switching system 104 connect only to modems 421–424 and use voice over IP for the voice calls to and from the terminals in the case where the terminals only have voice over IP software. For simplicity a connection is only shown to one of terminal 440–441. However, it is understood that all terminals are substantially identical.

Modem bank 420 includes modems 421–424. It should be noted that modem bank 420 may include any number of modems. The exact number of modems in modem bank 420 is left to a designer of a call center 400. Modems 421–424 are connected to bus 426 and transmit data over bus 426 to processing unit 430.

Processing unit 430 executes instructions for processes performed by modem pool 420. Processing unit 430 is connected to a non-volatile memory, such as ROM 432, via memory bus 431. The non-volatile memory stores instructions necessary for management of processing unit 430. A volatile memory, such as RAM 433, is connected to processing unit 430 via memory bus 431. The volatile memory stores data and instructions necessary for the processes being executed.

Processing unit 430 is also connected to network 450 via path 427 and bus 426. Messages containing data from call connected to modems 421–424 are transmitted over the network 450 to a proper terminal 440–442 handling the call. Modem bank 420 can also transmit messages to call controller 470 and CDR server 460 over network 450. The processes executed by modem bank 420 are described in FIGS. 12 and 13.

CDR Server 460 is provided by instructions executed by a processing unit 464. Processing unit 464 is connected to a volatile memory, such as RAM 466, and a non-volatile memory, such as ROM 467, via memory bus 465. Bus 463 may connect processing unit 464 to a secondary memory 462 and to network 450 via path 461. CDR server records all information about connected call for use in generating billing information. The processes performed by CDR server 460 are described in FIG. 14.

Components of terminals 440–441 are shown in terminal 440. Each terminal includes a computer system 445 connected to network 450 via path 446. Computer system 445 includes a display 448 for displaying text messages to a communication assistant. An input device, such as keyboard 443, is also included to receive data from a communication assistant. Telephone 444 may also connected to switching system 401 via path 407. Otherwise, the computer system may include speakers and a microphone as well as voice over IP software to allow the computer to be used for voice telephone calls. In a preferred embodiment, path 407 is a two-wire connection.

Figure 5:
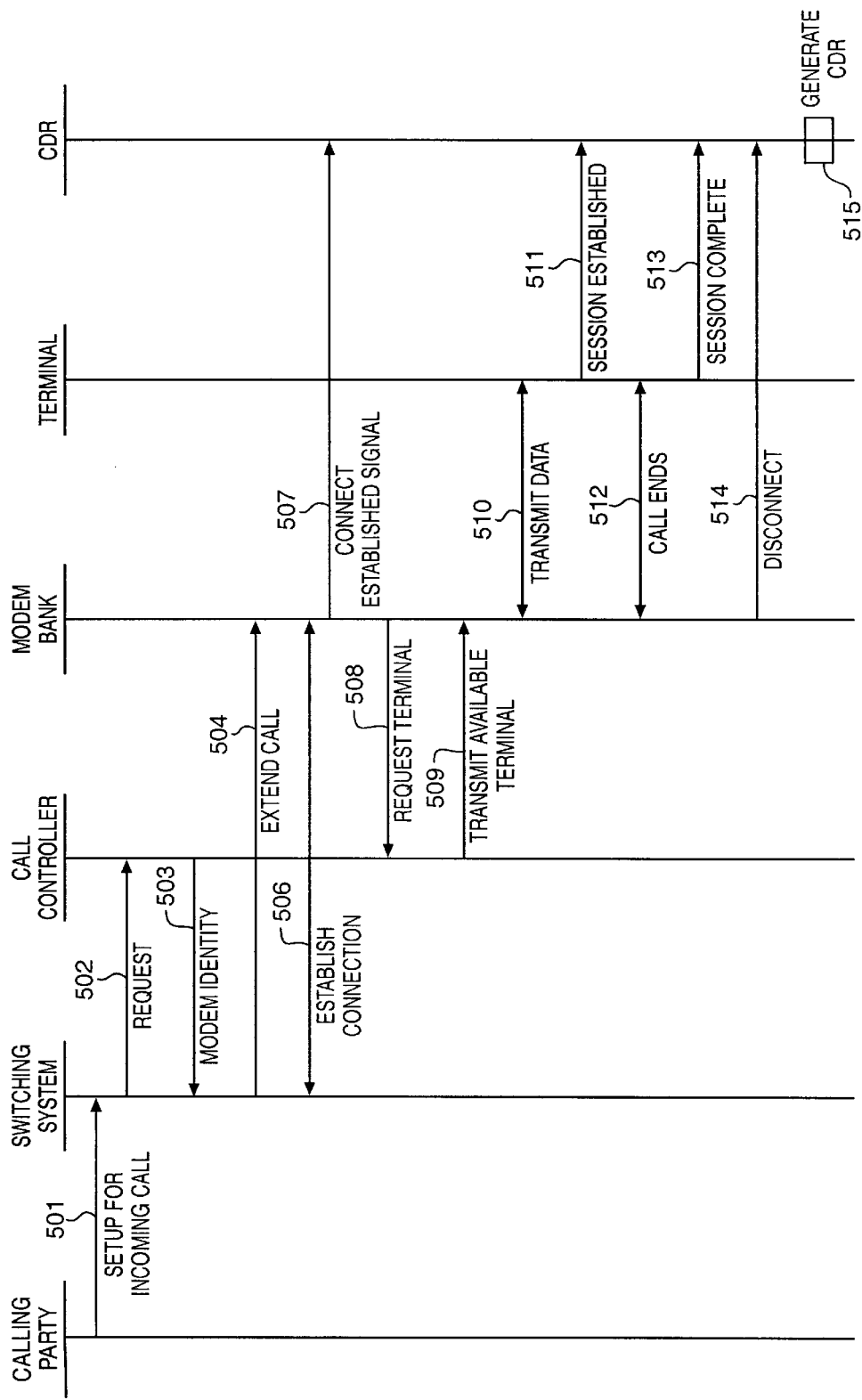
FIG. 5 illustrates a preferred exemplary embodiment of a signaling chart between components in the preferred exemplary embodiment.

FIG. 5 illustrates the signaling between components in a preferred embodiment of a call center to handle a call from a TDD/TYY device. First, a call set-up message 501 is received from the TDD/TYY device of a calling party. In response to the call set-up message 501, switching system 401 transmits a request 502 for an available modem to call controller 470. Call controller 470 transmits message 503 with the identity of an modem 421–424 to receive the call.

Switching system 401 transmits signal 504 to extend the call to the identified modem 421–424 in modem bank 420 in response to receiving the identity of the modem 421–424. The identified modem 421–424 then transmits a signal 506 that establishes a connection. After the connection is established, a connection established message 507 is transmitted to CDR server 460. Connection established message 507 may include the identity of the modem and the time of day of the connection. After receiving the connection established message 507, CDR server 460 generates a connection record.

After transmitting connection established message 507, modem bank 420 transmits terminal request 508 to call controller 460. Terminal request 508 is a request for an identity of a terminal 440–442 available to handle the incoming call. In response to receiving terminal request 508, call controller 460 determines which available terminal will handle the call and transmits a terminal available message 509 including the identity of the selected terminal. Modem bank 420 receives the identity of the modem and transmits data 510 of the call between the identified modem 421–424 and the identified terminal 440–442.

When data is first received by a terminal 440–442 from modem bank 420, the terminal 440–442 transmits a session established message 511 to CDR server 460. Session established signal 511 includes the identity of the terminal and may include the time of day the session was established.

After an undetermined amount of time, the call ends at time 512. When the call ends, a session complete message 513 is transmitted from the identified terminal 440–442 handling the call to CDR server 460. CDR server 460 receives the session completed signal 513 and updates the session record to indicate the amount of time the session lasted. This may be done by recording the time of day that the call ended and the time of day the call began.

After the call ends at time 512, modem bank 420 also transmits a connection ended signal 514 to CDR server 460. CDR server then updates the connection record to indicate the length of the connection. This may be done by storing both the time of day the connection is completed and the time of day the connection is ended.

Figure 6:
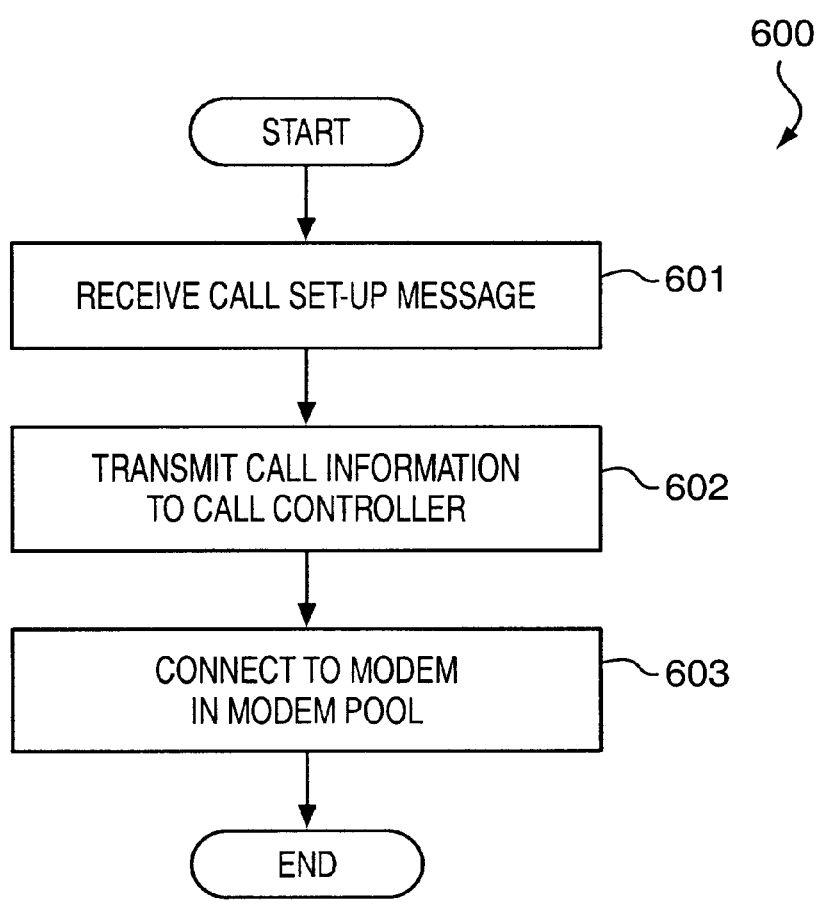
FIG. 6 illustrates a process executed by a switching system when a call set-up message is received in an exemplary embodiment.

The following FIGS. 6–18 illustrate processes executed by the various processes to provide TRS service from a call center. FIG. 6 illustrates the process 600 executed by the switching system 401 to handle a call extended to the switching system in the preferred embodiment. Process 600 begins in step 601 with switching system 401 receiving the call set-up message. In step 602, switching system 104 transmits the call information to call controller 470. Process 600 then ends in step 603 by connecting the call to a modem in the modem bank.

Figure 18:
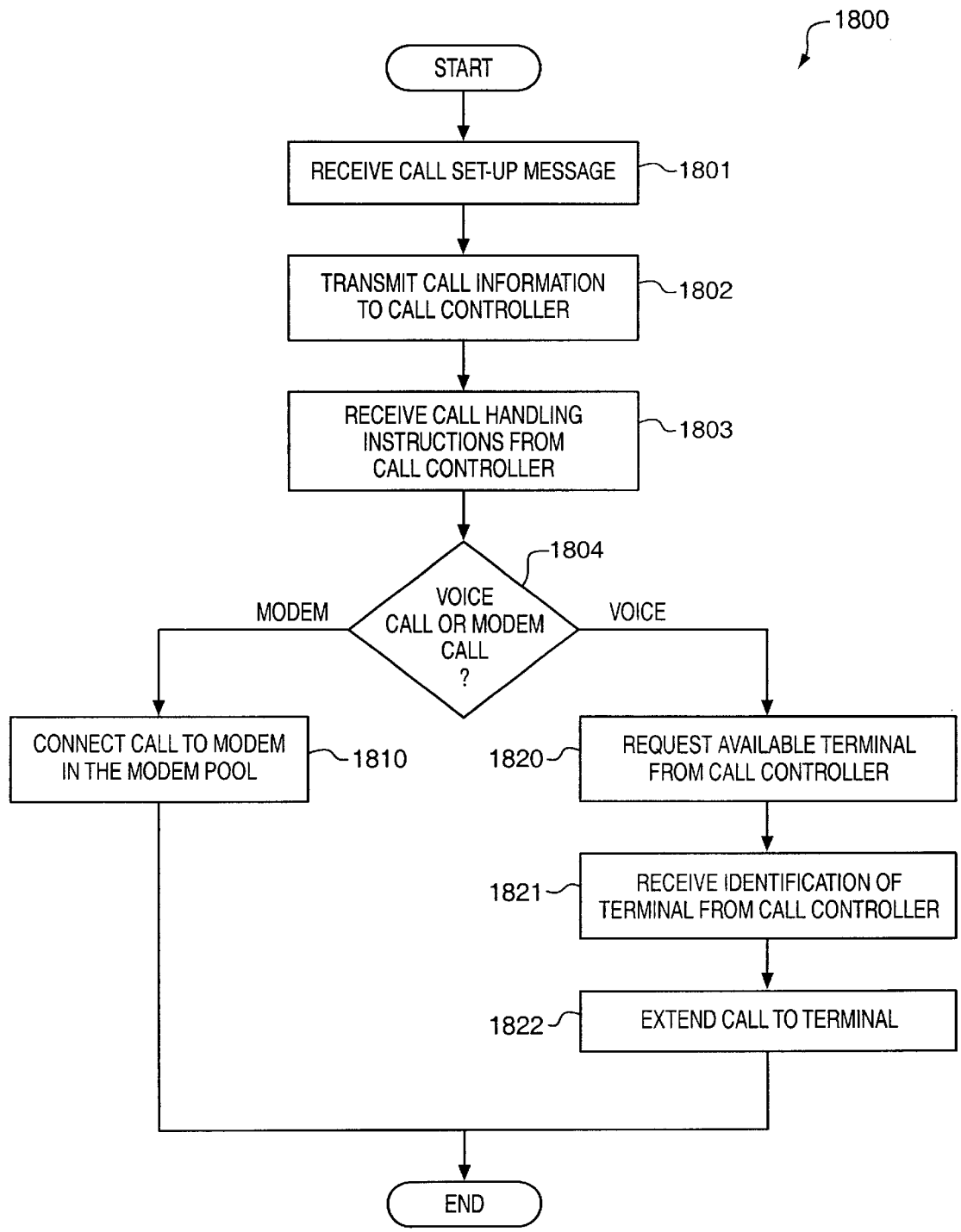
FIG. 18 illustrate an alternative process executed by a switching system when a call set up message is received.

Alternatively, switching system 401 may execute process 1800 in FIG. 18 to connect an incoming call. Process 1800 begins in step 1801 with switching system 401 receiving the call set up message. In step 1802, switching system 401 transmits call information to call controller 470. Switching system 401 may then receive call handling information in step 1803. Otherwise, switching system 401 determines whether the call is a voice or a modem call in step 1804.

If the call is a modem call, the call is then extended to the modem in step 1810 and process 1800 ends.

If the call is a voice call, switching system 401 transmits a request to call controller 470 for a terminal available to receive the call in step 1820. The identity of the terminal is received by switching system 403 in step 1821. The call is then extended to the telephone station of the terminal in step 1822 and process 1800 ends.

Figure 7:
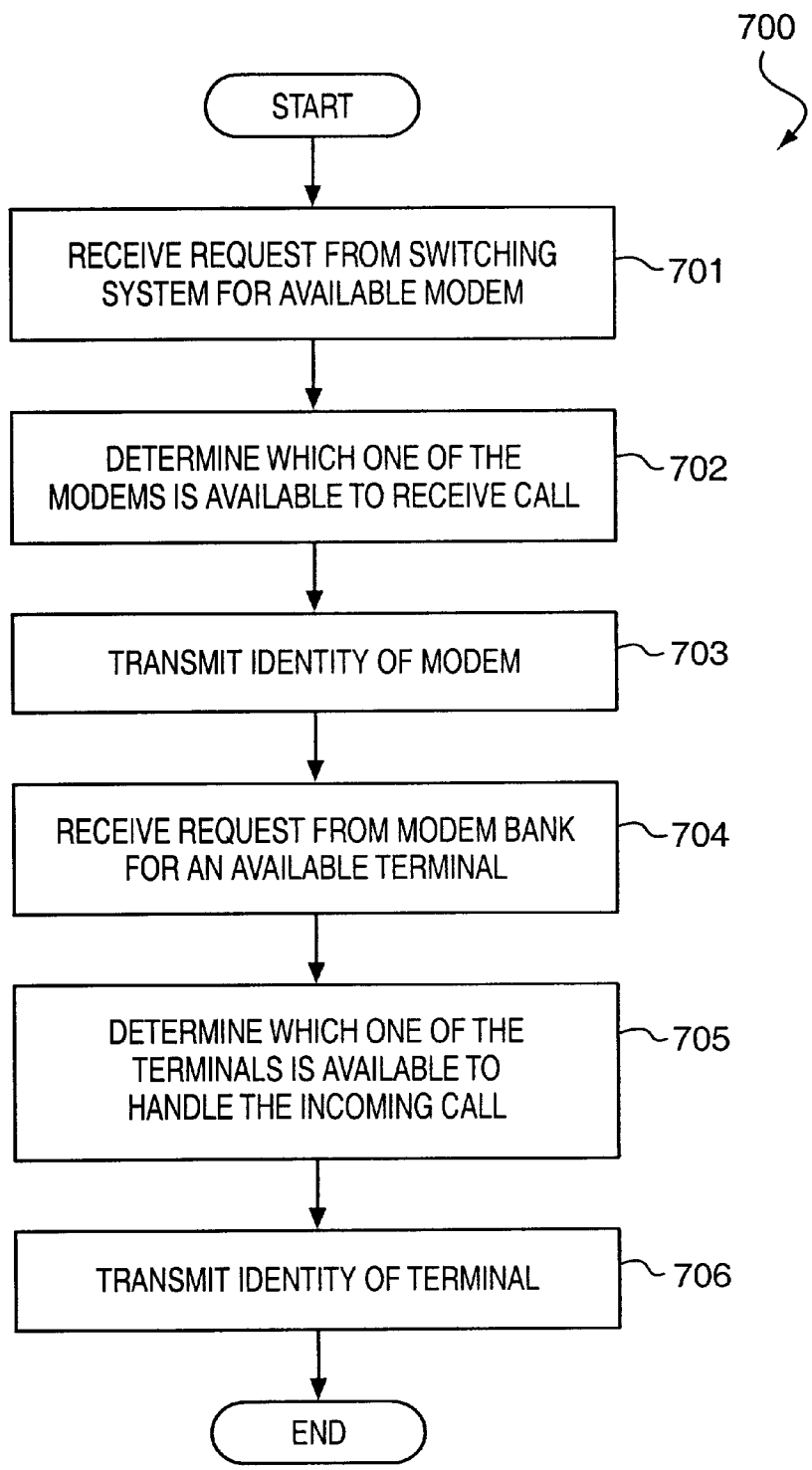
FIG. 7 illustrates a process executed by a call controller to establish a TRS session in the preferred exemplary embodiment.

FIG. 7 illustrates a process by call controller 470 to handle a call to call center 400 in the preferred exemplary embodiment. One skilled in the art will appreciate that not all of the steps of process 700 must be executed depending upon the configuration of the terminals, the switching system and the modem bank. Process 700 begins in step 701 with call controller 470 receiving a request from switching system 401 for an available modem or terminal to receive the call. In step 702, call controller 470 determines which of the available modems or terminals will handle the call. The determination of the available modem or terminal may be made by reading modem database 430 and by finding the next available modem.

In step 703, a message containing the identity of the selected modem is generated and transmitted to switching system 401. Next, call controller 470 receives a request message from modem bank 420 requesting a terminal to handle the call in step 704. In response to receiving the request message, call controller 470 determines which terminal is available to handle the call in step 705. The determination may be made by reading a terminal database 491 to find the next available terminal. Finally, process 700 ends in step 706 with call controller 470 generating and transmitting a message containing the identity of the terminal to modem bank 420.

Figure 8:
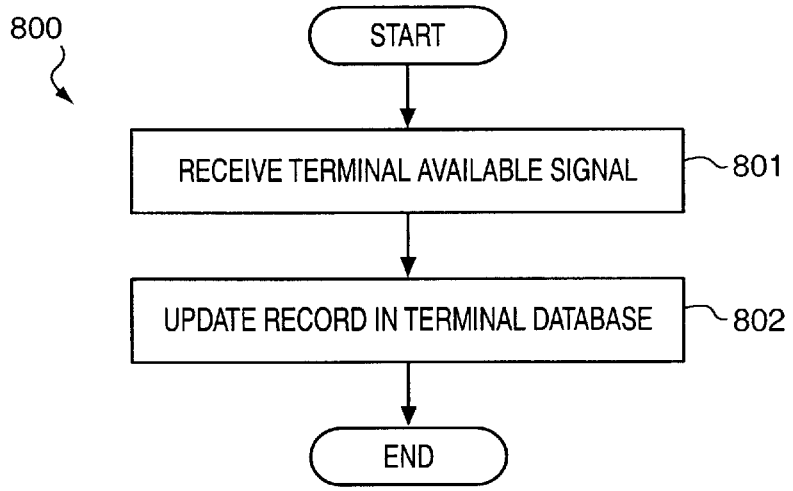
FIG. 8 illustrates a process executed by a call controller for updating a terminal database responsive to receiving a terminal available signal in the preferred exemplary embodiment.

Process 800 illustrated in FIG. 8 is a process for updating terminal database 491 that is maintained by call controller 470 in the preferred exemplary embodiment. In step 801, process 800 begins with call controller 470 receiving a terminal available message indicating that the terminal 440–442 is available to receive calls. This signal is received when a communication assistant logs onto the terminal or whenever a session with a call is completed. The call controller 470 then updates the database to indicate that the terminal is available to handle calls in step 802 and process 800 ends.

Figure 9:
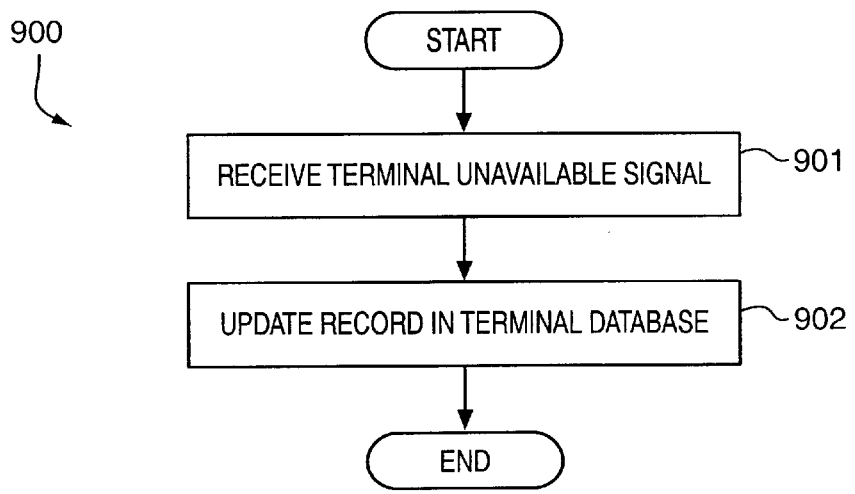
FIG. 9 illustrates a process executed by a call controller for updating a terminal database responsive to receiving a terminal unavailable signal in the preferred Preferred exemplary embodiment.

FIG. 9 illustrates a process 900 executed by call controller 470 to update a terminal database 491 to indicate that a terminal is not available to handle calls. Process 900 begins in step 901 with call controller 470 receiving a terminal unavailable message from a terminal 440–442. The terminal 440–442 transmits the terminal unavailable message when the terminal is handling a call and when a communication assistant logs-off the terminal. In response to receiving the terminal unavailable message, call controller 470 updates the terminal database 491 to indicate the terminal is unavailable to handle a call in step 902 and process 900 ends.

Figure 10:
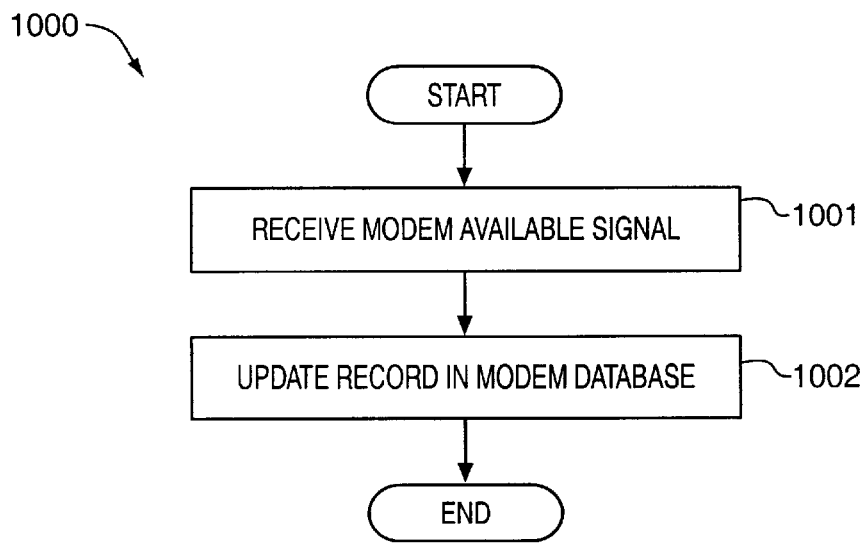
FIG. 10 illustrates a process executed by a call controller for updating a modem database responsive to receiving a modem available signal in the preferred exemplary embodiment.

Process 1000 illustrated in FIG. 10 is a process for updating modem database 490 that is maintained by call controller 470. In step 1001, process 1000 begins with call controller 470 receiving a modem available message from modem bank 420 indicating that one of modems 421–424 is available to receive calls. This modem message is received when a modem disconnects from a call. The call controller 470 then updates the modem database 490 to indicate that the modem 421–424 is available to handle calls in step 1002 and process 1000 ends.

Figure 11:
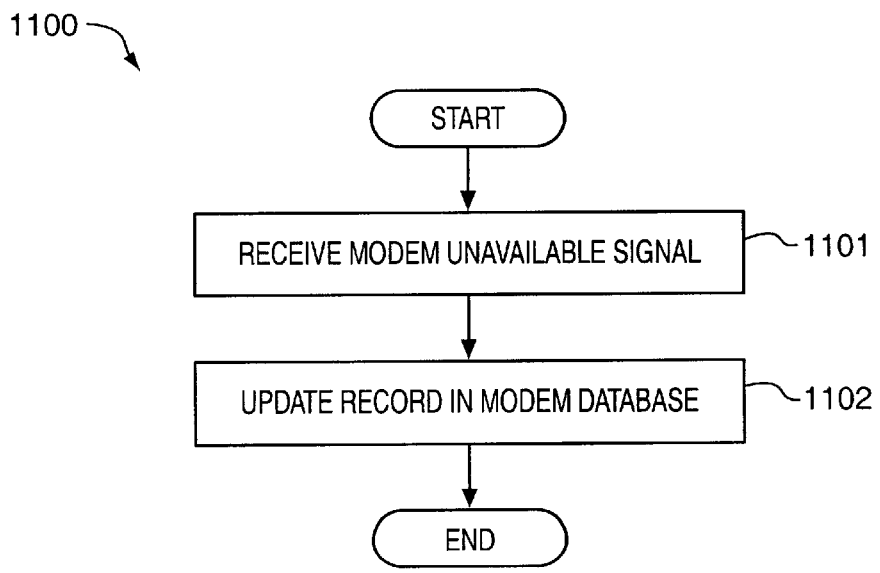
FIG. 11 illustrates a process executed by a call controller for updating a modem database responsive to receiving a modem unavailable signal in the preferred exemplary embodiment.

FIG. 11 illustrates a process 1100 executed by call controller 470 to update a modem database 491 to indicate that a modem 421–424 is not available to handle calls. Process 1100 begins in step 1101 with call controller 470 receiving a modem unavailable message from modem bank 420. The modem bank 420 transmits the modem unavailable message when a modem establishes a call. In response to receiving the modem unavailable message, call controller 470 updates the modem database 490 to indicate the terminal is unavailable to handle a call in step 1102 and process 1100 ends.

Figure 12:
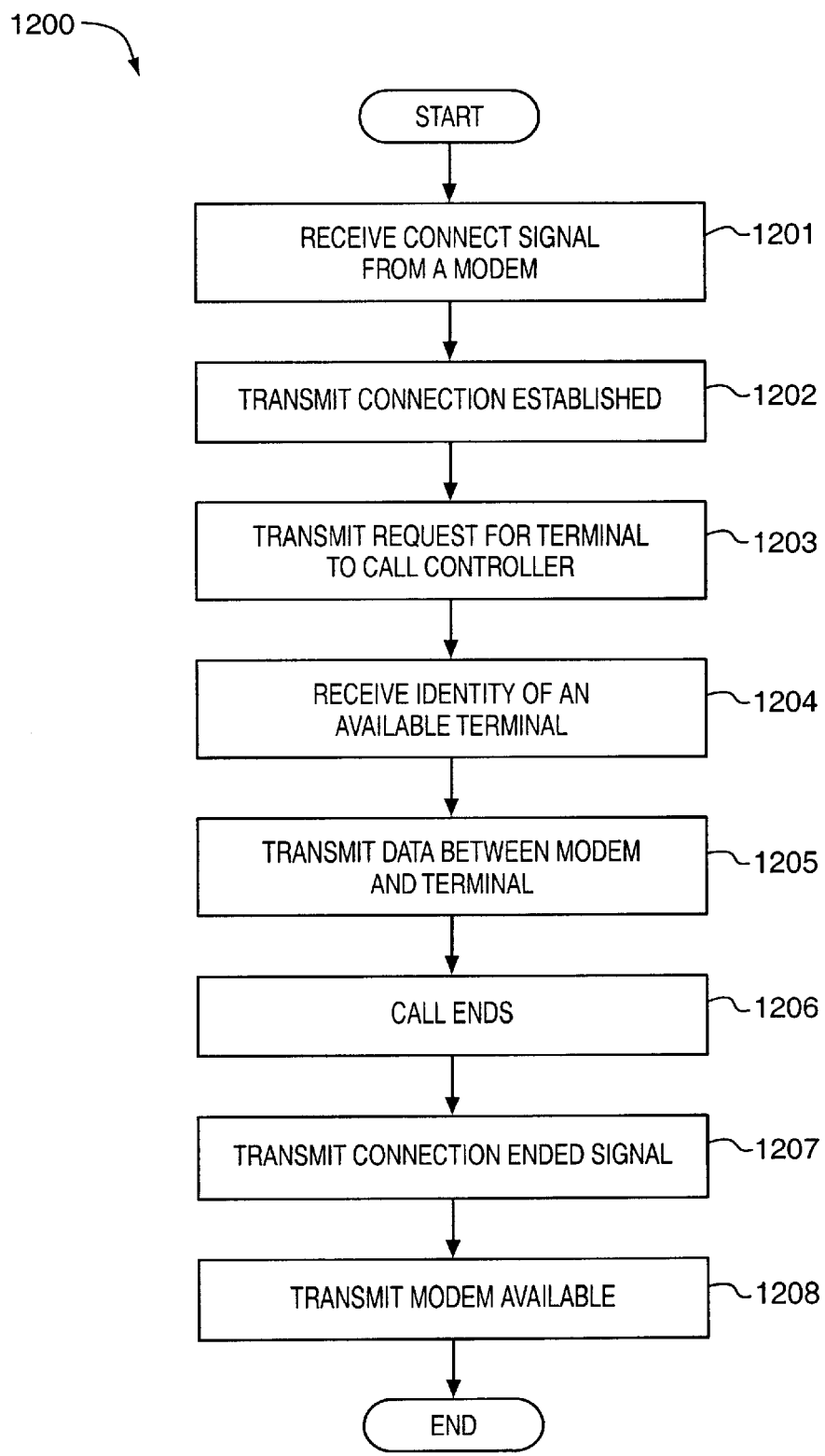
FIG. 12 illustrates a process executed by a modem bank to handle an incoming call.

FIG. 12 illustrates process 1200 executed by a modem bank when a modem is connected to an incoming call in the preferred embodiment. Process 1200 begins in step 1201 with modem bank 420 receiving a signal from a modem 421–424 indicating a incoming call has been connected to the modem 421–424. In step 1202, modem bank 420 transmits a connection established message to CDR server 460 to indicate the modem is connected to a call. In step 1203, a request for a terminal to handle the call is transmitted to call controller 470. Modem bank 420 then receives the identity of an available terminal 440–442 in step 1204. In step 1205, the data of the call is transmitted between the modem and the identified terminal. The call ends in step 1206 and a connection ended message is transmitted to CDR server 460 in step 1207. A modem available message is then transmitted to call controller 470 in step 1208 and process 1200 then ends.

Figure 13:
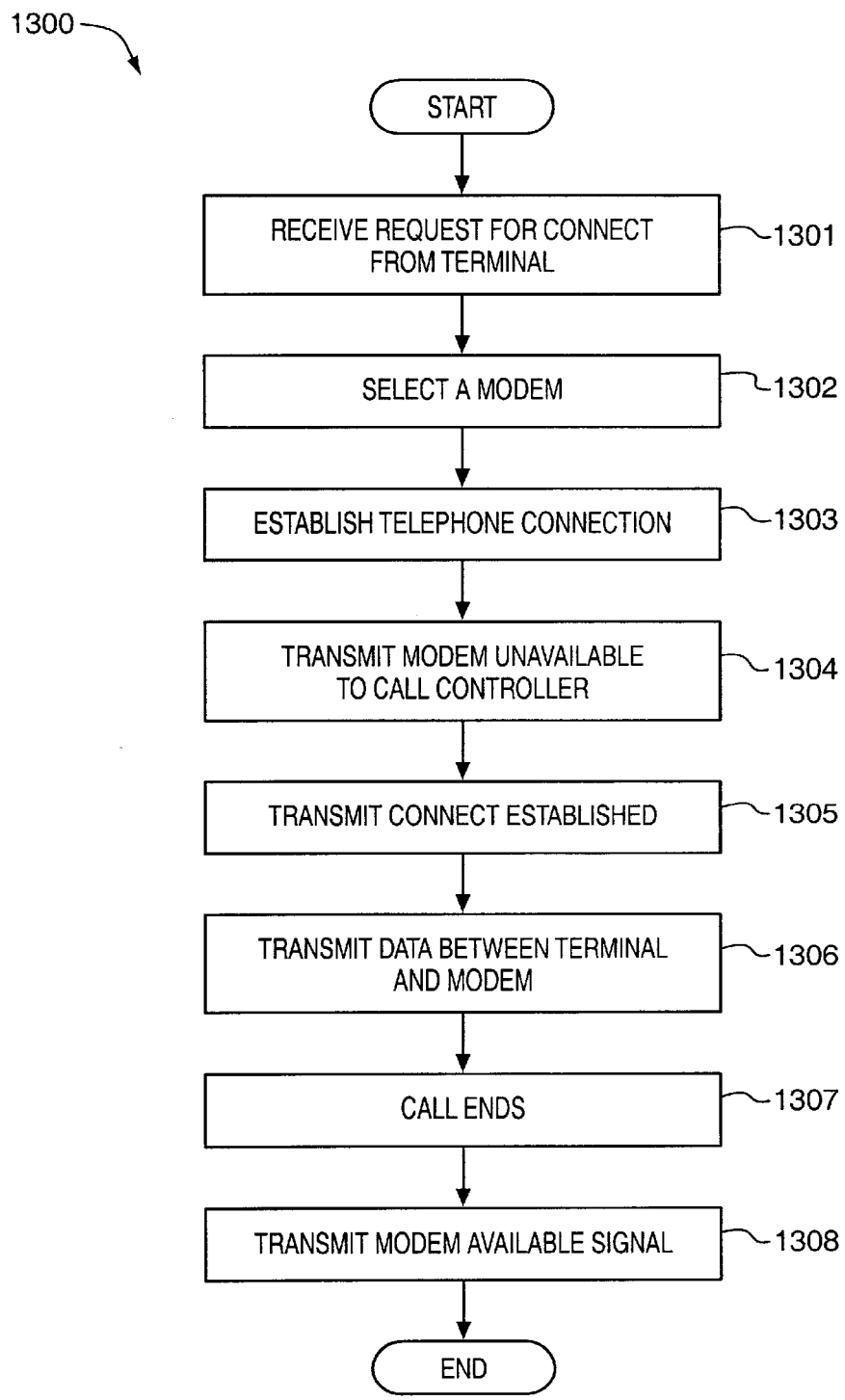
FIG. 13 illustrates a process executed by a modem bank to handle an outgoing call.

Process 1300 illustrated in FIG. 13 is the process executed by modem bank 420 when an outgoing call is completed through a modem 421–424 in the preferred exemplary embodiment. Process 1300 begins in step 1301 with modem bank 420 receiving a request from a terminal for a modem 421–424 to establish a call. Modem bank 420 then selects a modem to attempt the call in step 1302. In step 1303, a telephone call is established using the selected modem. A modem unavailable message is transmitted to the call controller 470 in step 1304 after the call is established. A connection established is then transmitted to CDR server 460 in step 1305.

Data is transmitted between the terminal 440–442 and the modem 421–424 in step 1306. In step 1307, the call ends. Modem bank 420 then transmits a connection ended message to CDR server 460 in step 1308 and a modem available message to call controller 470 in step 1309. Process 1300 ends after step 1308 is completed.

Figure 14:
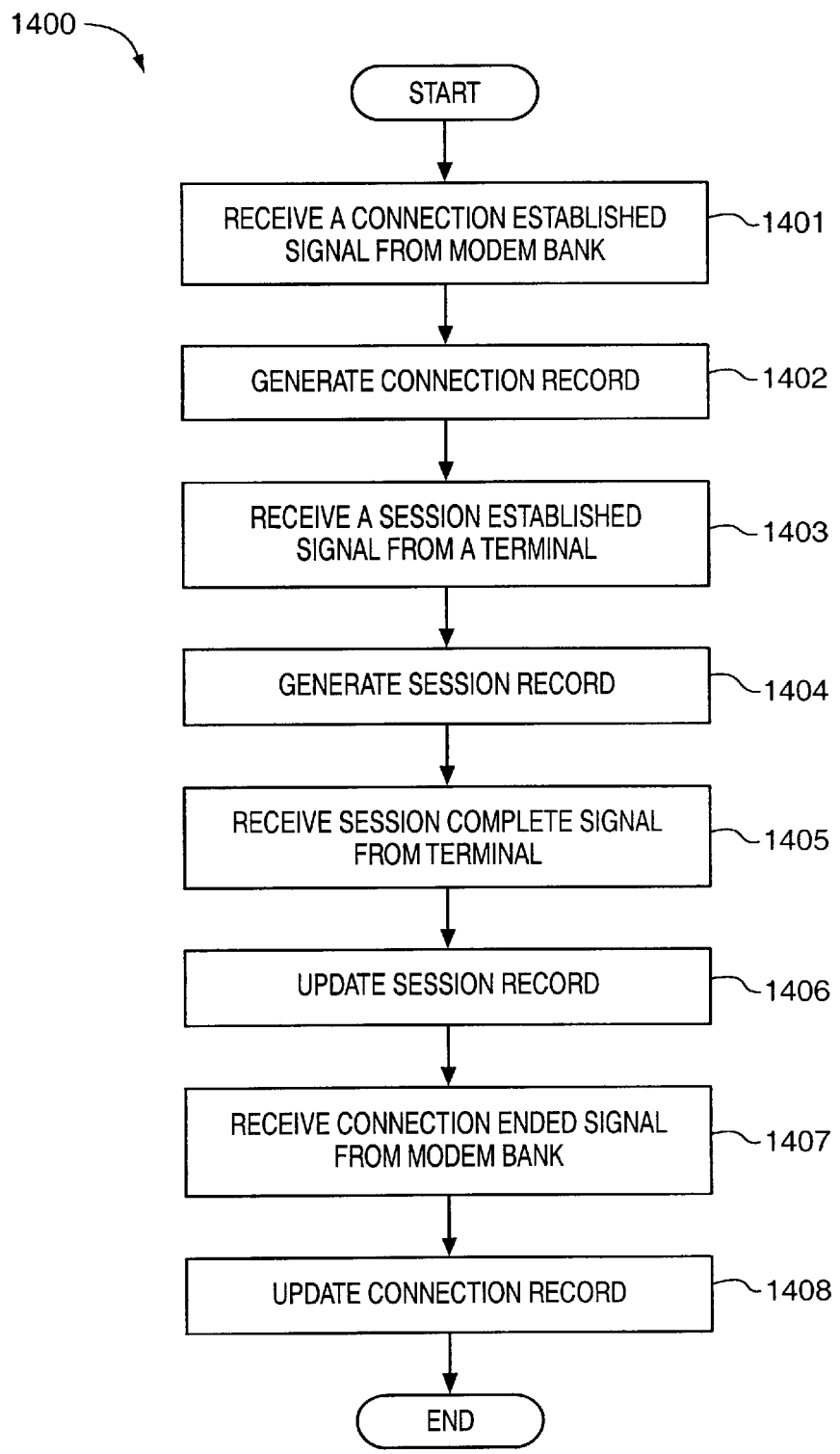
FIG. 14 illustrates a process executed by a Call Detail Record (CDR) Server in the preferred exemplary embodiment.

FIG. 14 illustrates a process 1400 executed by CDR server 460 to generate records of call to be used later for billing purposes in the preferred exemplary embodiment. Process 1400 begins in step 1401 by CDR server 460 receives a connection established message from modem bank 420. The connection established message is transmitted after each modem establishes a call whether the call is incoming or outgoing from call center 400. The connection established message may include the ANI of the incoming call, the extension connected to the call, and the time of day a connection was established. In response to receiving the connection established message, a connection record, which is a record stored recording information about the connection of the call to call center 400.

After a terminal begins receiving data from modem bank 420 for the call, the terminal generates a session established message. The session established signal is generated any time a terminal is processing a call regardless whether the call is received via voice or modem. In step 1403, a session established message is received by CDR server 460. The session established message may include a terminal identification, the type of call handled, and the time of day that the session is established. In response to receiving the session established message, CDR server 460 generates a session record. One skilled in the art may not that the connection record and session record may be stored in the same record for a particular call.

When the session is completed, CDR server 460 receives a session completed message from the terminal in step 1405. The session completed message may include the time of day the session is ended. In response to receiving the session completed message, CDR server updates the session record to indicate the length of time the session was established in step 1406.

After the call is disconnected, modem bank 420 transmits a connection ended message to CDR server 460. CDR server 460 receives the connection ended message in step 1407. In response to receiving the connection ended message from modem bank 420, CDR server 460 updates the connection record to indicate the length of the call in step 1408 and process 1400 ends.

Figure 15:
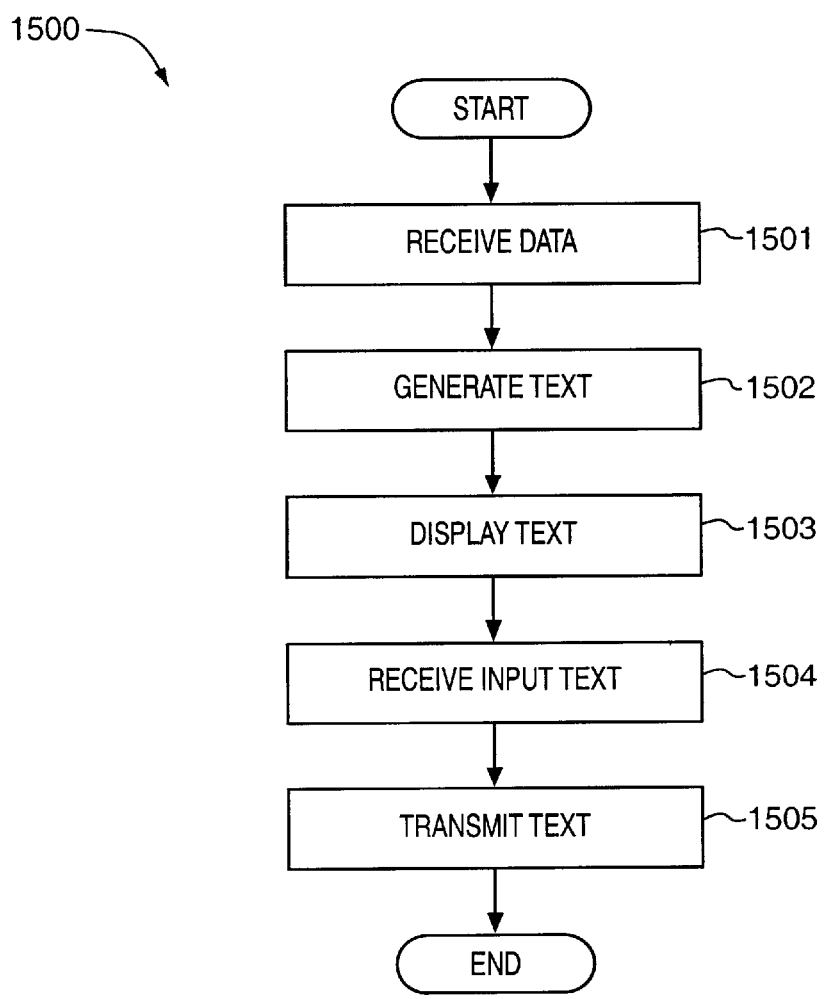
FIG. 15 illustrates a process executed by a terminal handle calls.

The computer systems of terminals 440–442 execute the following processes in order to provides TRS service the preferred exemplary embodiment of call center 400. FIG. 15 illustrates the process 1500 for handling data received for a call from a modem 421–424. Process 1500 begins in step 1501 by receiving data from a modem 421–424. In response to receiving the data, the data is converted into a display data in step 1502. In one embodiment, this may be display data. Alternatively, the data may be converted to audio data. The data is the displayed in step 1503. In the case of display data, the display data is transmitted to a screen to be read by a user. In the case of audio data, the audio data is may be transmitted to a call assistant or played over the second connection to a desired party. The displayed data is in some way relayed to a desired party via a second telephonic connection. When the desire party responds, the communication assistant must input the response into the computer for transmission to the TDD/TYY device. In step 1504, the computer system receives the data input by the communication assistant. In step 1505, the computer system generates messages containing the input data and transmits the messages over network 450 to modem bank 420 for transmission over the call circuit. Process 1500 is repeated for the duration of the call.

Figure 16:
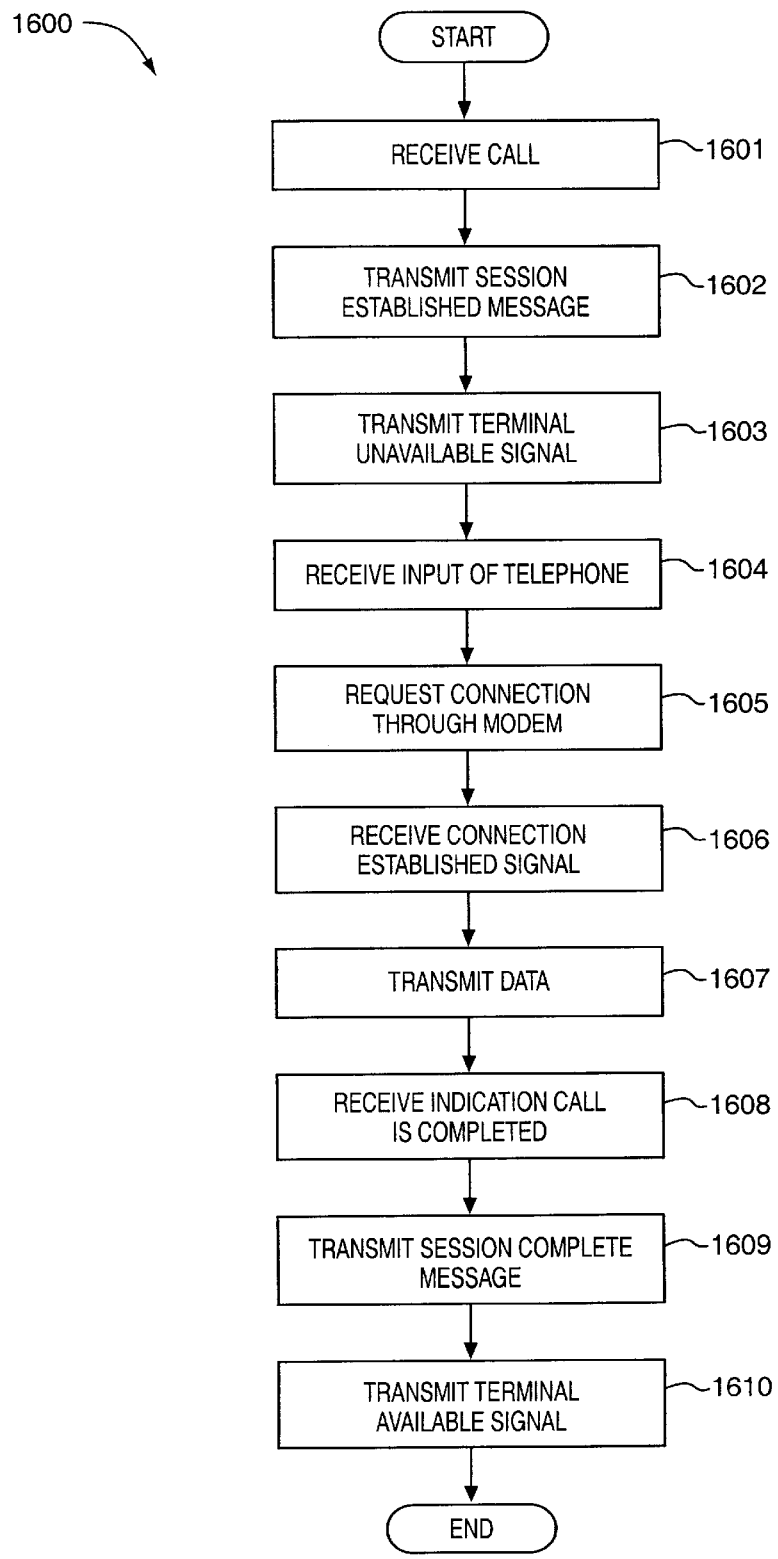
FIG. 16 illustrates a process executed by a terminal to handle a call connected to a TDD/TYY device.

Process 1600 illustrated in FIG. 16 is a process executed by a computer system in terminals 440–442 to complete a TRS call when a voice call is received by the terminal 440–442. Process 1600 begins in step 1601 with a call being received by terminal 440–442. In step 1602, the computer system transmits a session established message to CDR server 460. In step 1603, a terminal unavailable message may be transmitted to call controller 470 to indicate the terminal is handling a call. The computer system receives a telephone number for a telephone line connected to a TDD/TYY device in step 1604. In response to receiving a number, the computer system requests a modem 421–424 to establish the connections in step 1605. In step 1606, the computer system receives a message indicating that a connection has been established.

Data is then transmitted between the computer system and the TDD/TYY device via the telephone connection in step 1607. In step 1608, the computer terminal receives an indication that the call is completed. A session complete message is transmitted to the CDR server 460 in step 1609 in response to the call being completed. A terminal available message is transmitted to call controller 470 in step 1610 and process 1600 is complete.

Figure 17:
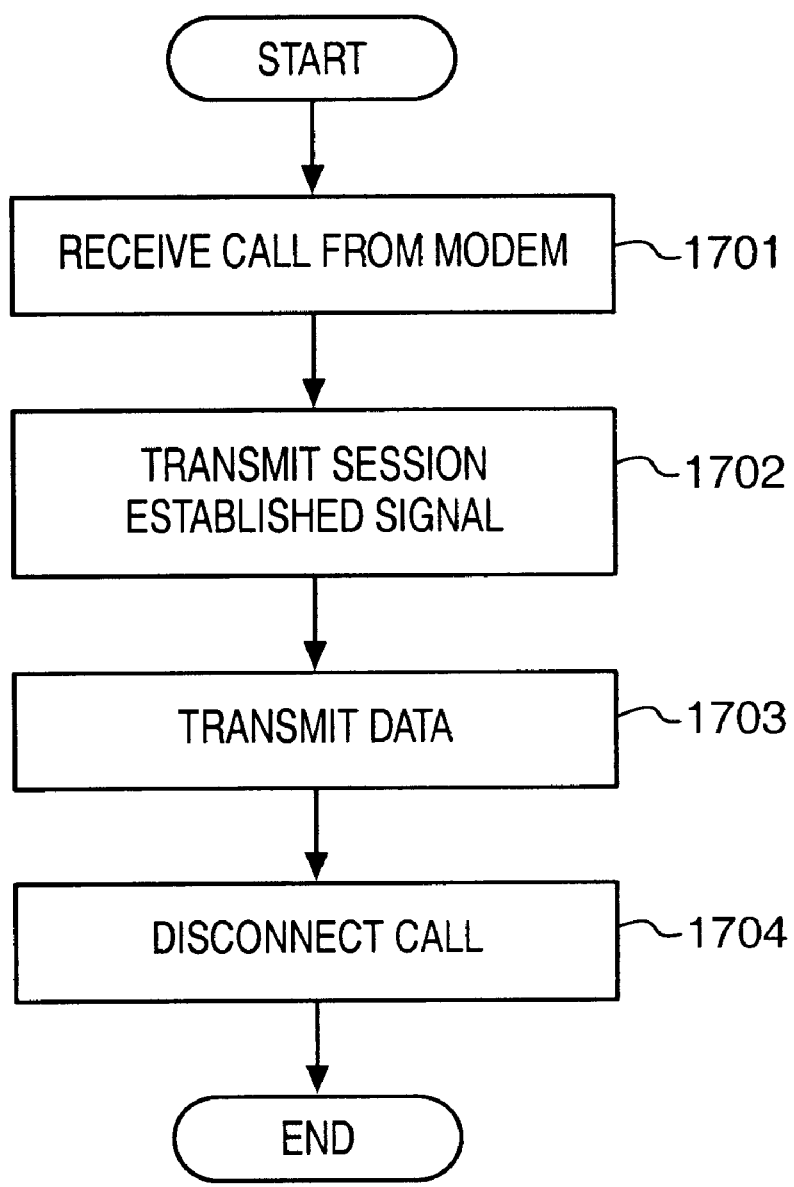
FIG. 17 illustrates a process executed by a terminal to handle a call to a TDD/TYY device.

FIG. 17 illustrates a process 1700 executed by computer systems in terminals 440–442 to handle a TDD/TYY call received by call center 400 in the preferred exemplary embodiment. Process 1700 begins with the terminal receiving data for a call from a modem 421–424 in modem bank 420 in step 1701. A session establish message is transmitted to CDR server 460 in step 1702. A terminal unavailable message may be transmitted to the call controller 470 to indicate the terminal is busy. In step 1703, data is transmitted between the modem 421–424 and the computer system of the terminal 440–442 for the duration of the call.

The call is then disconnected in step 1704. When the call is disconnected, a session ended message is transmitted to CDR server 460. A terminal available message is transmitted to call controller 470 to indicate the terminal 440–442 is available to handle another call and process 1700 ends.

The above-described steps in the processes of the embodiments of this invention can be comprised of instructions that are stored on storage media. The instructions can be retrieved and executed by a processing unit. Some examples of instructions are software, program code, and firmware. Some examples of storage media are memory devices, tape, disks, integrated circuits, and servers. The instructions are operational when executed by the processing unit to direct the processing unit to operate in accord with the invention. Those skilled in the art are familiar with instructions, processor, and storage media. Those skilled in the art will appreciate variations of the above-described embodiments that fall within the scope of the invention. As a result, the invention is not limited to the specific examples and illustrations discussed above, but only by the following claims and their equivalents.

I claim:

1. A call center that handles TTY calls for the hearing impaired, said call center comprising:

a modem bank that includes a plurality of modems wherein said modem bank is connected to a network and can transmit data from one of said plurality of modems over said network;

a plurality of terminals that handle calls connected to said network;

a call controller connected to said network and connected to a switching system;

instructions for directing a first processing unit in said call controller to:

receive a request from said switching system to connect an incoming call to said call center, determine which one of said plurality of modems in said modem bank will receive said call, transmit an identity of one of said plurality of modems to said switching system, determine which one of said plurality of terminals is available to handle said incoming call, and transmit an identity of said one of said plurality of terminals to said modem bank to direct transmission of data of said incoming call from said one of said plurality of modems in said modem bank to said one of said plurality of terminals; and a first media readable by said first processing unit in said call controller that stores said first instructions.

2. The call center of claim 1 wherein each of said plurality of terminals comprises:

a computer system connected to said network;

a telephone station connected to said switching system;

second instructions for directing a second processing unit in said computer system to:

receive data of said incoming call from said modem bank, and convert said data into a display of words received from a connected party; and a second media readable by said second processing unit in said computer system that stores said second instructions.

3. The call center of claim 2 wherein said second instructions for directing said second processing unit in said computer system convert said data into said display include:

said second instructions for directing said second processing unit to:

generate said display of said words, and apply said display of said words to a video display in said computer system.

4. The call center of claim 2 wherein said second instructions for directing said second processing unit in said computer system include:

said second instructions for directing said processing unit in said computer system to:

receive input data from an operator, convert said input data into transmission data, and transmit said transmission data to said connected party via said one of said plurality of modems in said modem bank handling said incoming call.

5. The call center of claim 2 further comprising:

a Call Detail Record (CDR) Server connected to said network;

third instructions for directing a third processing unit in said CDR server to:

generate a connection record of each call connected to one of said plurality of modems in said modem bank, and store said connection record in a memory connected to said third processing unit; and a third media readable by said third processing unit that store said third instructions.

6. The call center of claim 5 wherein said third instructions for directing said third processing unit in said CDR server further comprise:
said third instructions for directing said third processing unit:
generate a session record of each incoming call connected to one of said plurality of terminals, and
store said completion record in said memory connected to said processing unit.

7. The call center of claim 6 wherein said second instruction for directing said second processing unit in said computer system in said terminal further comprises:
said second instructions for directing said processing unit in said computer system to:
transmit a session established message to said CDR server responsive to said one of said terminal begins to receive data for an incoming call from one of said plurality of modems receiving said incoming call.

8. The call center of claim 7 wherein said second instructions for directing said second processing unit in said computer system of each of said plurality of terminals comprise:
said second instructions for directing said processing unit to:
transmit a session complete message to said CDR server responsive to said one of said incoming call being disconnected.

9. The call center of claim 8 wherein said third instructions for directing said third processing unit in said CDR server further comprise:
said third instructions for directing said processing unit to:
receive said session established message,
receive said session complete message, and
generate said session record indicate a length of time of a session.

10. The call center of claim 6 wherein said bank of modems includes:
a fourth processing unit;
fourth instructions for directing said fourth processing unit to:
generate a connection established message responsive to said incoming call being connected to one of said plurality of modems, and
transmit said connection established message to said CDR server responsive to said connection established signal being generated; and
a fourth media readable by said fourth processing unit that stores said fourth instructions.

11. The call center of claim 10 wherein said fourth instructions for directing said fourth processing unit in said modem bank includes:
said fourth instructions for directing said fourth processing unit to:
generate a connection ended message responsive to said modem disconnecting said incoming call, and
transmit said connection ended message to said CDR server.

12. The call center of claim 11 wherein said third instructions for directing said third processing unit in said CDR server further comprise:
said third instructions for directing said third processing unit to:
receive said connection established signal,
receive said connection ended signal, and
generate said connection record from said established signal and said connection completed signal.

13. The call center of claim 2 wherein said second instructions for directing said second processing unit in each said terminal further comprises:
said second instructions for directing said second processing unit to:
generate a terminal available message responsive to a user being available at said terminal to handle incoming calls, and
transmit said terminal available message to said call controller.

14. The call center of claim 13 wherein said second instructions for directing said second processing unit in each of said terminals further comprises:
said second instructions for directing said second processing unit to:
generate a terminal unavailable message responsive to said user not being available to handle incoming calls, and
transmit said terminal unavailable message to said call controller.

15. The call center of claim 1 wherein said first instructions for directing said first processing unit in said call controller further comprise:
said first instructions for directing said first processing unit in said call controller to:
maintain an agent database that indicates which ones of said plurality of terminals are available to handle incoming calls.

16. The call center of claim 1 further comprising:
said switching system communicatively connected to said call controller.

17. The call center of claim 16 further comprising:
a fifth processing unit associated with said switching system;
fifth instructions for directing said fifth processing unit to:
transmit a request to said call controller for an available one of said plurality of modems in said modem bank responsive to said switching system receiving a request to set-up an incoming call,
receive said identity of said one of said plurality of modems from said call controller responsive to said request, and
extend said incoming call to said one of said plurality of modems responsive to receiving said identity; and
a fifth media readable by said fifth processing unit that stores said fifth instructions.

18. The call center of claim 17 wherein said fifth instructions for directing said fifth processing unit associated with said switching system further include:
said fifth instructions for directing said fifth processing unit to:
transmit a request for an identity of a telephone station at one of said plurality of terminals that is available to receive said incoming call,
receive said identity of said telephone station at one of said plurality of terminals responsive to said request, and
extend said incoming call to said telephone station responsive to receiving said identity of said telephone station.

19. A method for handling calls in a call center comprising the steps of:
receiving a request from a switching system to connect an incoming call to said call center;

determining which one of a plurality of modems in a modem bank connected to a network will receive said incoming call;

transmitting an identity of one of said plurality of modems chosen to handle said incoming call to said switching system;

determining which one of a plurality of terminals connected to said network is available to handle said incoming call; and transmitting an identity of said one of said plurality of terminals to said modem bank to direct transmission of data of said incoming call from said one of said plurality of modems in said modem bank to said one of said plurality of terminals over said network.

20. The method of claim 19 further comprising the steps of:

receiving data of said incoming call in a computer system at said one of said terminal from said modem bank over said network; and converting said data into a display of words received from a connected party.

21. The method of claim 20 wherein said step of converting comprises the steps of:

generating said display of said words; and applying said display of said words to a video display in said computer system.

22. The method of claim 20 further comprising the steps of:

receiving input data from an operator at one of said plurality of terminals, converting said input data into transmission data, and transmitting said transmission data to a connected party via said one of said plurality of modems in said modem bank handling said incoming call.

23. The method of claim 20 further comprising the steps of:

generating a connection record of each call connected to one of said plurality of modems in said modem in a Call Detail Record (CDR) server; and Storing said connection record in a memory associated with said CDR server.

24. The method of claim 23 further comprising the steps of:

generating a session record of each incoming call connected to one of said plurality of terminals; and storing said completion record in said memory associated with said CDR server.

25. The method of claim 24 further comprising the step of:

transmitting a session established message from said one of said plurality of terminals to said CDR server responsive to said one of said terminal beginning to receive data for said incoming call from one of said plurality of modems receiving said incoming call.

26. The method of claim 24 further comprises the step of:

transmitting a session complete message to said CDR server responsive to said one of said incoming call being disconnected.

27. The method of claim 25 further comprising the steps of:

receiving said session established message in said CDR server;

receiving said session complete signal in said CDR server; and generating said session record including length of time of a session, and time of day of said session in said CDR server.

28. The method of claim 24 further comprising the steps of:

generating a connection established message in said modem band responsive to said incoming call being connected to one of said plurality of modems; and transmitting said connection established message from said modem bank to said CDR server responsive to said connection established signal being generated.

29. The method of claim 27 further comprising the steps:

generating a connection ended message in said modem bank responsive to said modem disconnecting said incoming call, and transmitting said connection ended message from said modem bank to said CDR server.

30. The method of claim 28 further comprising the steps of:

receiving said connection established message in said CDR server;

receiving said connection ended message in said CDR server; and generating said connection record from said connection established message and said connection completed message.

31. The method of claim 19 further comprising the step of:

maintaining a agent database with a call controller that indicates which ones of said plurality of terminals are available to handle incoming calls.

32. The method of claim 30 further comprising the steps of:

generating a terminal available message responsive to a user being available at said terminal to handle incoming calls, and transmitting said available message to said call controller.

33. The method of claim 30 further comprising the steps of:

generating a terminal unavailable message responsive to said user not being available to handle incoming calls, and transmitting said terminal unavailable message to said call controller.

34. The method of claim 19 further comprising:

receiving a request for an incoming call to a call center in said switching system;

transmitting a request to said call controller for an available one of said plurality of modems in said modem banks responsive to said switching system receiving a request to set-up an incoming call;

receiving said identity of said one of said plurality of modems from said call controller responsive to said request; and extending said incoming call to said one of said plurality of modems responsive to receiving said identity.

35. The method of claim 34 wherein said incoming call is a voice call and said method further comprises the steps of:

transmitting a request from said switching system to said call controller for an identity of a telephone station at one of said plurality of terminals that is available to receive said incoming call;

receiving said identity of said telephone station at one of said plurality of terminals responsive to said request; and extending said incoming call to said telephone station responsive to receiving said identity of said telephone station.

* * * * *